US012094428B2

(12) United States Patent
Tada

(10) Patent No.: US 12,094,428 B2
(45) Date of Patent: Sep. 17, 2024

(54) DISPLAY APPARATUS THAT CONTROLS AMOUNT OF LIGHT FROM LIGHT SOURCE IN ACCORDANCE WITH VIDEO SIGNAL, AND CONTROL METHOD THEREFOR

(71) Applicant: CANON KABUSHIKI KAISHA, Tokyo (JP)

(72) Inventor: Mitsuru Tada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/500,319

(22) Filed: Oct. 13, 2021

(65) Prior Publication Data

US 2022/0130340 A1 Apr. 28, 2022

(30) Foreign Application Priority Data

Oct. 22, 2020 (JP) ................................ 2020-177597

(51) Int. Cl.
*G09G 3/34* (2006.01)
*G09G 3/36* (2006.01)

(52) U.S. Cl.
CPC ........... *G09G 3/342* (2013.01); *G09G 3/3406* (2013.01); *G09G 3/3426* (2013.01); *G09G 3/36* (2013.01); *G09G 3/3607* (2013.01); *G09G 2310/08* (2013.01); *G09G 2320/0247* (2013.01); *G09G 2320/0626* (2013.01);
(Continued)

(58) Field of Classification Search
CPC ....... G09G 2360/16; G09G 2320/0646; G09G 2320/0626; G09G 3/342; G09G 3/3413; G09G 3/36; G09G 3/22; G09G 2320/0266; G09G 3/34; G09G 3/3426; G09G 2360/12; G09G 3/3406; G09G 2320/0247; G09G 3/3607; G09G 2320/064; G09G 2320/02
See application file for complete search history.

(56) References Cited

U.S. PATENT DOCUMENTS 11,205,393 B2 * 12/2021 Kang .................. G09G 3/2025
2005/0184952 A1 * 8/2005 Konno ................ G09G 3/3648
345/102
(Continued)

FOREIGN PATENT DOCUMENTS

JP 2005258403 A 9/2005
JP 2012242682 A 12/2012
(Continued)

*Primary Examiner* — Dismery Mercedes
(74) *Attorney, Agent, or Firm* — Canon U.S.A., Inc. IP Division

(57) ABSTRACT

An apparatus that displays a video in accordance with an input signal, the apparatus includes a backlight including a plurality of light sources, a panel configured to display the video by modulating light from the backlight, a determination section configured to determine an amount of light of each of the plurality of light sources subframe by subframe, a controller configured to control the plurality of light sources in accordance with the determined amounts of light, and an acquisition section configured to acquire a statistic in a plurality of areas subframe by subframe in accordance with the input signal. The determination section is configured to determine the amount of light of each of the plurality of light sources in accordance with the statistic.

20 Claims, 10 Drawing Sheets

(52) U.S. Cl.
CPC ................. *G09G 2320/064* (2013.01); *G09G 2320/0646* (2013.01); *G09G 2360/12* (2013.01); *G09G 2360/16* (2013.01)

(56) References Cited

U.S. PATENT DOCUMENTS

| | | | | |
|---|---|---|---|---|
| 2006/0164379 | A1* | 7/2006 | Oh | G09G 3/342 345/102 |
| 2007/0085785 | A1* | 4/2007 | Ozaki | G09G 3/3275 345/77 |
| 2007/0229863 | A1* | 10/2007 | Ono | G06T 5/008 358/1.9 |
| 2008/0204396 | A1* | 8/2008 | Otome | G09G 3/3648 345/102 |
| 2008/0225183 | A1* | 9/2008 | Tomizawa | G09G 3/2037 348/739 |
| 2008/0284881 | A1* | 11/2008 | Ikizyan | G09G 3/2025 348/E5.069 |
| 2009/0115718 | A1* | 5/2009 | Qiao | G09G 3/3611 345/102 |
| 2009/0122087 | A1* | 5/2009 | Maruyama | G09G 3/3611 345/102 |
| 2010/0165003 | A1* | 7/2010 | Hiranuma | G09G 3/002 348/E9.034 |
| 2010/0245398 | A1* | 9/2010 | Amino | G09G 5/10 345/213 |
| 2012/0038694 | A1* | 2/2012 | Nakanishi | G09G 3/3426 345/694 |
| 2012/0075536 | A1* | 3/2012 | Uehara | G09G 3/3611 348/731 |
| 2013/0293598 | A1* | 11/2013 | Ishihara | G09G 3/3648 345/88 |
| 2014/0002335 | A1* | 1/2014 | Oda | G09G 3/3648 345/102 |
| 2014/0232764 | A1* | 8/2014 | Nishio | G02F 1/1336 345/102 |
| 2014/0267456 | A1* | 9/2014 | Ando | G09G 3/3413 345/102 |
| 2015/0015599 | A1* | 1/2015 | Yaras | G06T 11/001 345/600 |
| 2015/0356905 | A1* | 12/2015 | Watanabe | G09G 3/3648 345/88 |
| 2016/0086529 | A1* | 3/2016 | Myers | G09G 3/2003 345/691 |
| 2016/0171916 | A1* | 6/2016 | Buckley | G09G 3/2029 345/84 |
| 2019/0295477 | A1* | 9/2019 | Tada | G09G 3/3611 |
| 2019/0378253 | A1* | 12/2019 | Huang | G06T 5/20 |
| 2020/0074941 | A1* | 3/2020 | Takahashi | G09G 3/36 |
| 2021/0012720 | A1* | 1/2021 | Kang | G02F 1/133602 |
| 2021/0027723 | A1* | 1/2021 | Kang | G09G 3/3413 |

FOREIGN PATENT DOCUMENTS

| | | | |
|---|---|---|---|
| JP | 2013246277 | A | 12/2013 |
| JP | 2018045089 | A | 3/2018 |
| JP | 2019168594 | A | 10/2019 |

* cited by examiner

INPUT VIDEO SIGNAL
VERTICAL SYNCHRONIZATION SIGNAL V
SUBFRAME SYNCHRONIZATION SIGNAL VS
LIQUID CRYSTAL DISPLAY VIDEO SIGNAL
LIGHT EMISSION SECTION
FINAL LUMINANCE
501
502
510
520
521
522
530
531
532
5312
5313
5412
5413
5512
5513

FIG. 10

| | | LAST FRAME DATA | | | | | | | | |
|---|---|---|---|---|---|---|---|---|---|---|
| | | 0 | 1 | · · · | 64 | · · · | 128 | · · · | 254 | 255 |
| CURRENT FRAME DATA | 0 | 1.00 | 0.90 | · · · | 0.50 | · · · | 0.50 | · · · | 0.80 | 0.78 |
| | 1 | 0.85 | 1.00 | · · · | 0.50 | · · · | 0.50 | · · · | 0.78 | 0.77 |
| | · · · | · · · | · · · | · · · | · · · | · · · | · · · | · · · | · · · | · · · |
| | 64 | 0.50 | 0.50 | · · · | 1.00 | · · · | 0.50 | · · · | 0.50 | 0.50 |
| | · · · | · · · | · · · | · · · | · · · | · · · | · · · | · · · | · · · | · · · |
| | 128 | 0.50 | 0.50 | · · · | 0.50 | · · · | 1.00 | · · · | 0.50 | 0.50 |
| | · · · | · · · | · · · | · · · | · · · | · · · | · · · | · · · | · · · | · · · |
| | 254 | 0.51 | 0.54 | · · · | · · · | · · · | · · · | · · · | 1.00 | 0.90 |
| | 255 | 0.50 | 0.52 | · · · | · · · | · · · | · · · | · · · | 0.90 | 1.00 |

DISPLAY APPARATUS THAT CONTROLS AMOUNT OF LIGHT FROM LIGHT SOURCE IN ACCORDANCE WITH VIDEO SIGNAL, AND CONTROL METHOD THEREFOR

BACKGROUND OF THE DISCLOSURE

Field of the Disclosure

The aspect of the embodiments relates to a display apparatus that controls the amount of light from a light source in accordance with a video signal, and a control method therefor.

Description of the Related Art

In recent years, there is a local dimming (hereinafter, LD) control technology for modulating the brightness of each of light sources in a plane according to an input video signal as one of systems that achieve high-contrast display in a liquid crystal display apparatus. Alternatively, there is a global dimming (hereinafter, GD) control technology for modulating a light source luminance over the entire screen in accordance with a video signal.

Generally, a liquid crystal display apparatus is not capable of rewriting the tones (transmittances) of all the pixels at a time, so the liquid crystal display apparatus performs sequential scanning to rewrite the tones of the pixels from the top of a liquid crystal panel to the bottom of the liquid crystal panel over a frame period in which a video is input. Then, the light sources perform scanning turn-on to emit light by sequentially scanning from the top of the liquid crystal panel toward the bottom of the liquid crystal panel according to the sequential scanning.

However, if LEDs that are light sources are blinked once during one-frame period, a flicker that occurs in each vertical synchronization period (hereinafter, frame flicker) is visually recognized. To reduce the frame flicker, blinking control over the LEDs that are light sources is performed by turning on the LEDs separately in a plurality of subframes in accordance with a brightness determined for each frame period.

In this case, the amount of light in each subframe, emitted from the LEDs that are the light sources of a backlight, is determined from an input video signal in one frame period. For this reason, if all the light sources are subjected to scanning turn-on during one subframe period, the amounts of light of the light sources associated with an area not yet subjected to which sequential scanning of liquid crystal pixels to be performed over one frame period are also changed.

When the turn-on timing of each of the light sources and the rewrite timing of the liquid crystal do not coincide with each other, the luminance of a video to be displayed is displayed at a luminance different from an input video luminance, and a luminance error occurs. When the luminance error increases, the luminance error is visually recognized as a flicker that occurs in each subframe period (hereinafter, subframe flicker).

Particularly, to reduce a frame flicker, when subframe light emission is performed multiple times, the luminance error increases, with the result that the frequency of occurrence of subframe flicker increases.

A technology to reduce unintended amounts of light by controlling the turn-on timing of a backlight in accordance with a change in response of liquid crystal to improve motion picture response is described (Japanese Patent Laid-Open No. 2018-045089). A technology to reduce the amount of light that leaks due to a delay in response of liquid crystal by gradually changing the luminance in a subframe period is described (Japanese Patent Laid-Open No. 2019-168594).

In Japanese Patent Laid-Open No. 2018-045089, the amount of light cannot be calculated according to liquid crystal in a light source area to emit light in units of subframe, so the amount of light cannot be controlled subframe by subframe according to a change in the panel of liquid crystal to be sequentially scanned. For this reason, when LD control or GD control for changing the brightness of the backlight is performed in accordance with a video signal, a luminance error occurs, and a subframe flicker is visually recognized.

In Japanese Patent Laid-Open No. 2019-168594, the luminance of each subframe can be just gradually changed for each BL control area, and the amount of light cannot be controlled subframe by subframe according to a change in the panel of liquid crystal to be sequentially scanned. For this reason, when LD control or GD control for changing the brightness of the backlight is performed in accordance with a video signal, a luminance error occurs, and a subframe flicker is visually recognized.

SUMMARY OF THE DISCLOSURE

An apparatus that displays a video in accordance with an input signal. The apparatus includes a backlight including a plurality of light sources, a panel configured to display the video by modulating light from the backlight, a determination section configured to determine an amount of light of each of the plurality of light sources subframe by subframe, a controller configured to control the plurality of light sources in accordance with the determined amounts of light, and an acquisition section configured to acquire a statistic in a plurality of areas subframe by subframe in accordance with the input signal. The determination section is configured to determine the amount of light of each of the plurality of light sources in accordance with the statistic.

Further features of the disclosure will become apparent from the following description of exemplary embodiments with reference to the attached drawings.

BRIEF DESCRIPTION OF THE DRAWINGS

FIG. 10 is a schematic view of a response table data structure.

DESCRIPTION OF THE EMBODIMENTS

First Embodiment

Outline of Display Apparatus

In the present embodiment, an operation to execute light amount control over a light emission section for each subframe period in accordance with a statistic of a video signal in each subframe period will be described.

In the present embodiment, a video is able to be displayed with a reduced subframe flicker by implementing light amount control over light sources according to a statistic that correlates with a video signal to be displayed by liquid crystal.

In the first embodiment, subframe flicker reduction control in the case where local dimming control is performed only with backlight control will be described.

Configuration of Display Apparatus

Figure 1:
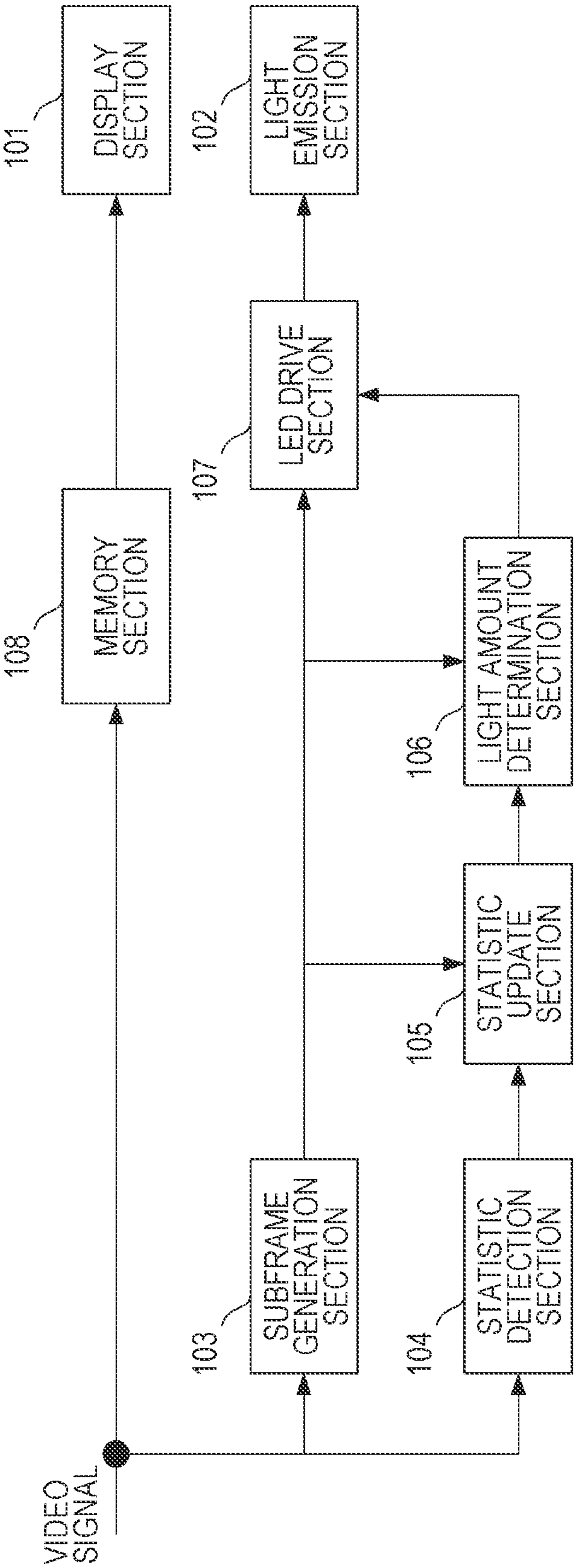
FIG. 1 is a block diagram showing the configuration of a display apparatus according to a first embodiment.

FIG. 1 is a diagram showing the configuration of a display apparatus according to the first embodiment. The display apparatus includes a display section 101, a light emission section 102, a subframe generation section 103, a statistic detection section 104, a statistic update section 105, a light amount determination section 106, an LED drive section 107, and a memory section 108. Of these, the subframe generation section 103, the statistic detection section 104, the statistic update section 105, the light amount determination section 106, and the LED drive section 107 are implemented by at least one processor.

The display section 101 is a display panel that displays an input video signal. The display section 101 is, for example, a liquid crystal panel. Generally, when a liquid crystal panel updates and displays a one-screen image in each vertical synchronization period for a video signal, the liquid crystal panel updates a display image by sequentially changing a liquid crystal voltage from the top of the screen to the bottom of the screen for the input video signal.

In other words, a liquid crystal panel updates a one-frame video over a vertical synchronization period.

The light emission section 102 is a backlight (BL) that emits light to be irradiated to the display section 101. The light emission section 102 uses, for example, LEDs as light sources and has a plurality of BL control areas (divided areas). The BL control areas are driven in accordance with a turn-on control signal D output from the LED drive section 107, and the luminance of the LEDs of each BL control area is controlled independently.

Figure 2:
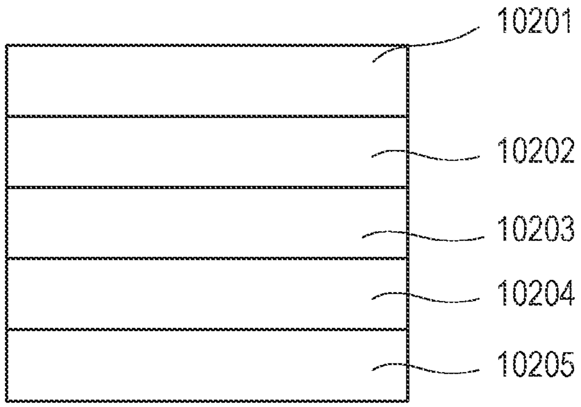
FIG. 2 is a schematic view of control areas.

FIG. 2 shows a schematic view of divided BL control areas of the light emission section 102. In FIG. 2, there are five BL control areas 10201 to 10205.

The subframe generation section 103 is a processing circuit that generates a subframe synchronization signal VS from a vertical synchronization signal for an input video signal. When, for example, the vertical synchronization signal for an input video signal has 60 Hz, the subframe generation section 103 generates the subframe synchronization signal VS with 300 Hz. In the present embodiment, it is assumed that a subframe synchronization signal VS is generated five times as many as an input video signal. A generated subframe synchronization signal VS is output to the statistic update section 105, the light amount determination section 106, and the LED drive section 107.

The statistic detection section (statistic acquisition section) 104 is a processing circuit that detects an average luminance value Y for each image range of a video signal associated with each of the BL control areas of the light emission section 102. In the present embodiment, the light emission section 102 is divided into five areas from the top of the screen to the bottom of the screen, so the statistic detection section 104 acquires an average luminance value Y of each of the five areas for a video signal.

An average luminance value Y is expressed as Ymn where a row number and a column number indicating the position of a control area that emits light are respectively m and n.

Generally, a video signal is input in time-series from the top of the screen toward the bottom of the screen. For this reason, the timing at which an average luminance value Y is able to be calculated varies among the BL control areas of the light emission section 102. Therefore, an average luminance value Y is output to the statistic update section 105 at timing at which the average luminance value Y is calculated for each area.

In the present embodiment, the subframe generation section 103 generates a subframe synchronization signal VS five times as many, so one average luminance value Ymn is generated for each period of one subframe synchronization signal VS and is output to the statistic update section 105.

The statistic update section 105 holds the number of average luminance values Y input from the statistic detection section 104, corresponding to the number of the BL control areas of the light emission section 102, for each period of a subframe synchronization signal VS output from the subframe generation section 103. The statistic update section 105 directly outputs the held average luminance values Y of all the BL control areas to the light amount determination section 106 as subframe average luminances YS.

A subframe average luminance YS is expressed as YSmn where a row number and a column number indicating the position of a control area that emits light are respectively m and n.

The subframe average luminance YS is updated for each BL control area in accordance with a video signal input over one vertical synchronization period. The statistic update section 105 outputs the held subframe average luminances YS to the light amount determination section 106 for each period of the subframe synchronization signal VS.

Figure 3:
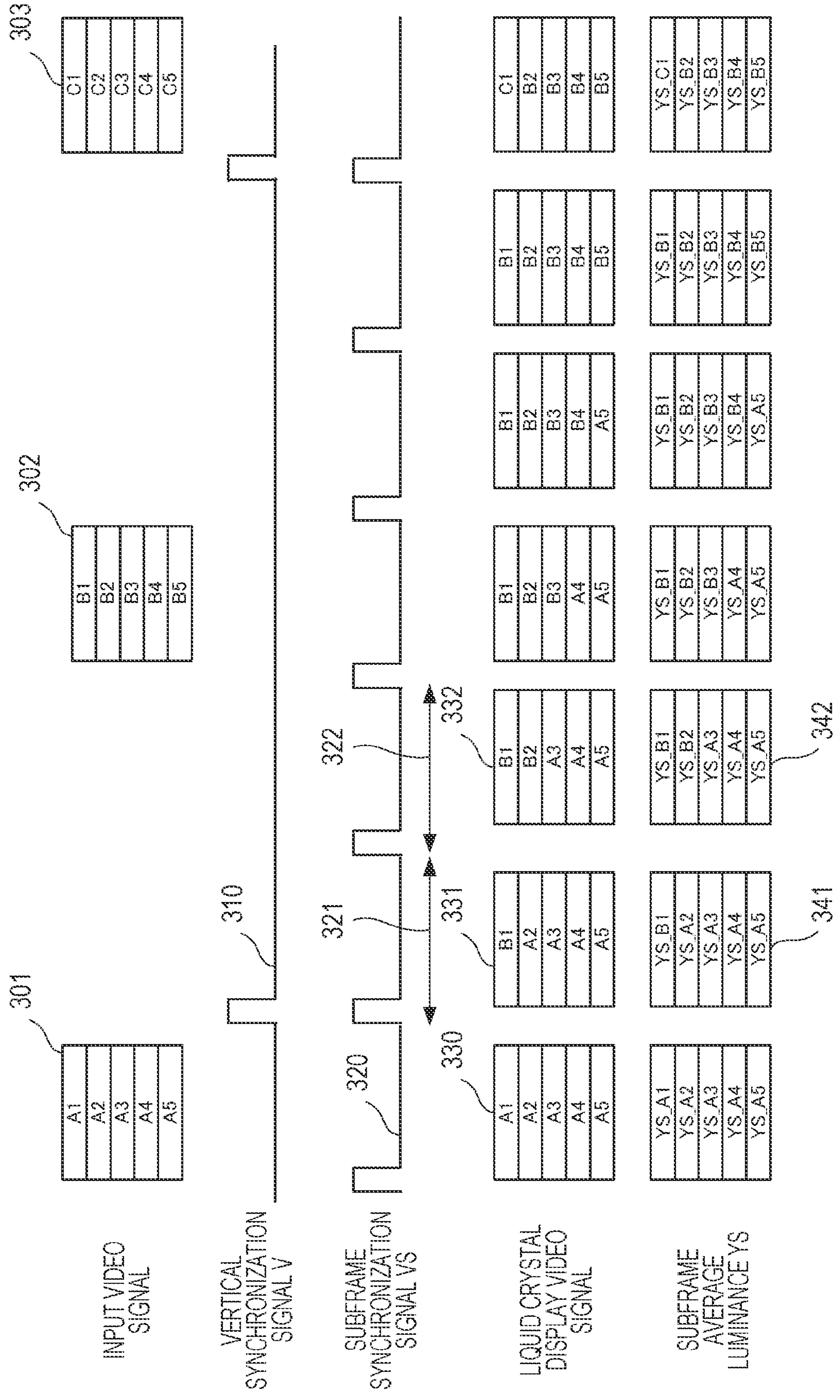
FIG. 3 is a schematic view of average luminances.

FIG. 3 is a schematic view showing how an input video signal is displayed on the liquid crystal panel and what average luminance YS the statistic update section 105 outputs in each subframe period.

In the schematic view, the case where a delay of a video signal to be displayed by liquid crystal from the timing at which a subframe average luminance YS is ideally zero by a memory of the memory section 108, which holds multiple-line images, will be described.

Initially, video signals input in respective frame periods are indicated by 301, 302, and 303. For the video signal 301, an input one-frame video is divided into five blocks in an up and down direction, the areas are defined as A1, A2 from above, and the bottom area is defined as an image A5. Similarly, the video signal 302 is divided into video areas B1 to B5, and the video signal 303 is divided into video areas C1 to C5.

A synchronization signal 310 is a vertical synchronization signal V.

A synchronization signal 320 is a subframe synchronization signal VS.

In the present embodiment, the vertical synchronization period shows a three-frame video change, and a subframe synchronization signal period shows seven subframe synchronization periods in total including five subframe synchronization periods corresponding to one-frame period and one subframe synchronization signal period of each of front and rear frames.

Video signals to be displayed on the liquid crystal panel subframe by subframe are indicated by 330, 331, and 332.

Initially, in the last subframe synchronization period in which the video signal 301 is input, the video signal 330, as in the case of the video signal 301, is displayed by liquid crystal.

In the next subframe synchronization period 321 included in the next vertical synchronization period, it is in a state 331 where the topmost area B1 of the video signal 302 is displayed by liquid crystal and, in the other areas, the last vertical synchronization period videos A2 to A5 are displayed.

In the subsequent subframe synchronization period 322, it is in a state 332 where a signal up to the area B2 is updated, and the remaining areas A3 to A5 are not updated.

In this way, on the liquid crystal panel, a video is updated from the top area for each subframe synchronization period.

The statistic update section 105 receives an average luminance Y of an input video signal from the statistic detection section 104 for each BL control area of the light emission section 102. The average luminance Y is a signal that correlates with a video signal displayed on the liquid crystal panel in each BL control area.

For this reason, in the subframe synchronization period 321, an average luminance YS signal 341 that correlates with signals 331 displayed on the liquid crystal panel is output to the light amount determination section 106. Similarly, in the next subframe synchronization period 322, an average luminance YS 342 is output.

The light amount determination section 106 is a processing circuit that determines light source control information bd of each control area of the light emission section 102 according to the input subframe average luminances YS. Light source control information bd is information for controlling the brightness of LEDs in each control area of the light emission section 102. The light amount determination section 106 determines the brightness of each control area from input subframe average luminances YS. The light amount determination section 106 transmits the determined light source control information bd of each control area to the LED drive section 107.

A method of converting into light source control information bd for each control area will be described. When the subframe average luminance of each control area is YSmn and the maximum luminance value is Ymax, light source control information bd of each control area can be calculated by the following expression (1).

$$bdmn = YSmn \div Y\max \quad (1)$$

Here, light source control information bd of each control area is information for controlling the brightness of LEDs in each control area. When the unit of luminance control of the light emission section 102 is divided in m rows in the vertical direction and n columns in the horizontal direction, light source brightness information of the mth-row and n-th column control area is defined as bdmn.

A maximum luminance value Ymax is a maximum luminance value when local dimming control is set in an off state.

Thus, bdmn is a matrix with a size of m×n. The light source control information bd is an integer that ranges from 0 to 255 and indicates that the control area emits brighter light as the value increases.

Figure 4:
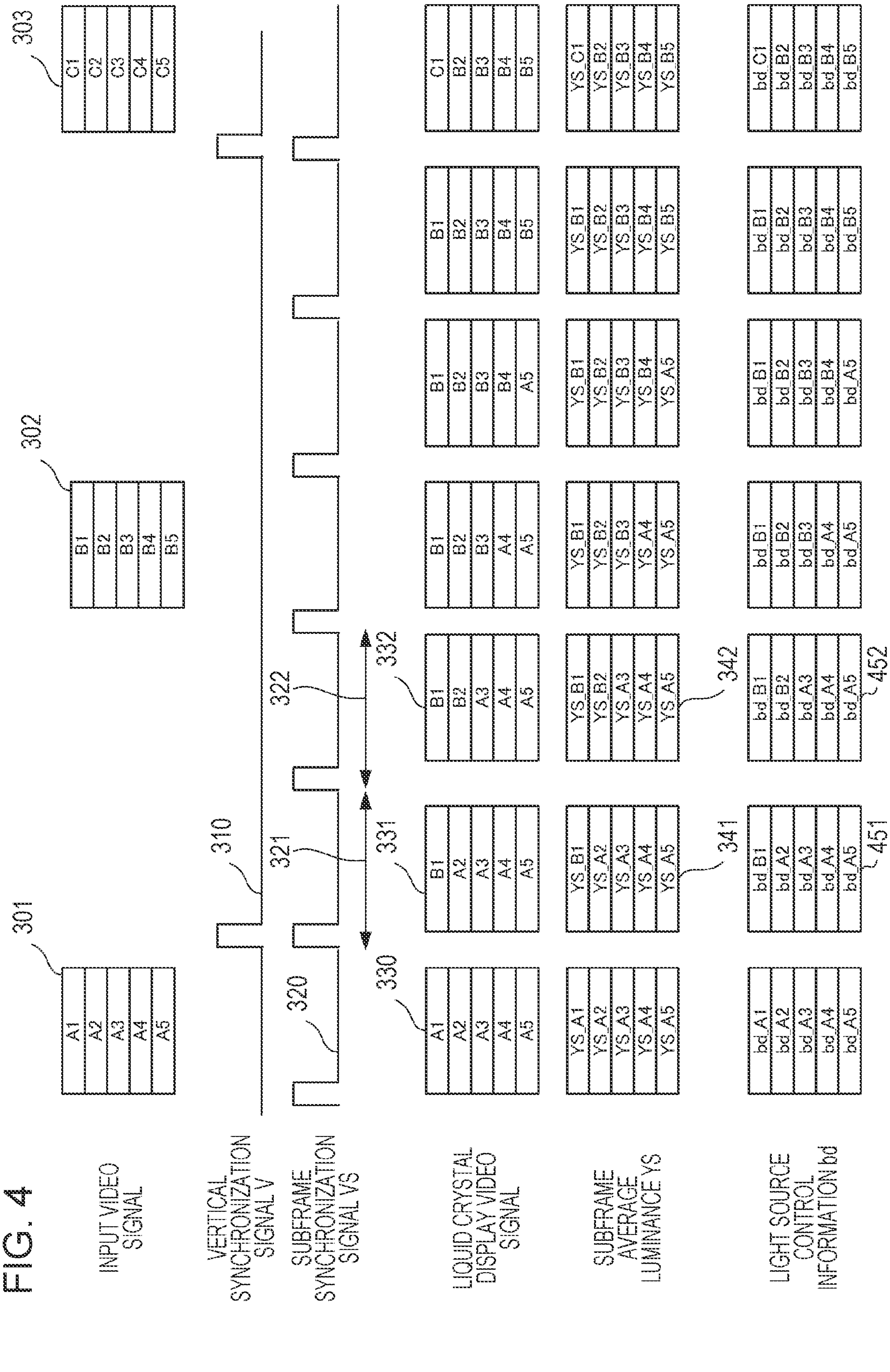
FIG. 4 is a schematic view of light source control information calculation timing.

FIG. 4 shows a schematic view of timing at which light source control information bd is calculated when a video signal similar to that of FIG. 3 is input.

In the subframe synchronization period 321, light source luminance control information 451 calculated from the average luminance YS signal 341 is calculated. Similarly, in the subframe synchronization period 322, light source luminance control information 452 calculated from an average luminance YS signal 342 is calculated.

In this way, light source control information bd is control information that correlates with a video signal displayed on the liquid crystal panel.

The LED drive section 107 is a processing circuit that outputs light source control information bd as a turn-on control signal D in each subframe period in accordance with light source control information bd from the light amount determination section 106 and a synchronization signal for an input video signal. The turn-on control signal D is output to the light emission section 102.

The memory section 108 is a memory for temporarily storing an input video signal.

In the present embodiment, to adjust timing to start displaying a video signal on the display section 101 with a turn-on control signal D output from the LED drive section 107, a video signal is temporarily stored, and the timing is adjusted. This adjustment of the timing may be performed by the LED drive section 107 adjusting the timing to output the turn-on control signal D in consideration of the pre-calculated response of the display section 101 (liquid crystal panel).

A memory capacity used to adjust the timing is greater than or equal to a line memory capacity corresponding to the number of pixels in the vertical direction, corresponding to one area of the light emission section 102.

Method of Reducing Subframe Flicker

Initially, a difference in occurrence of a subframe flicker between existing drive and drive according to the embodiment of the disclosure will be described with reference to FIG. 5 and FIG. 6.

Figure 5:
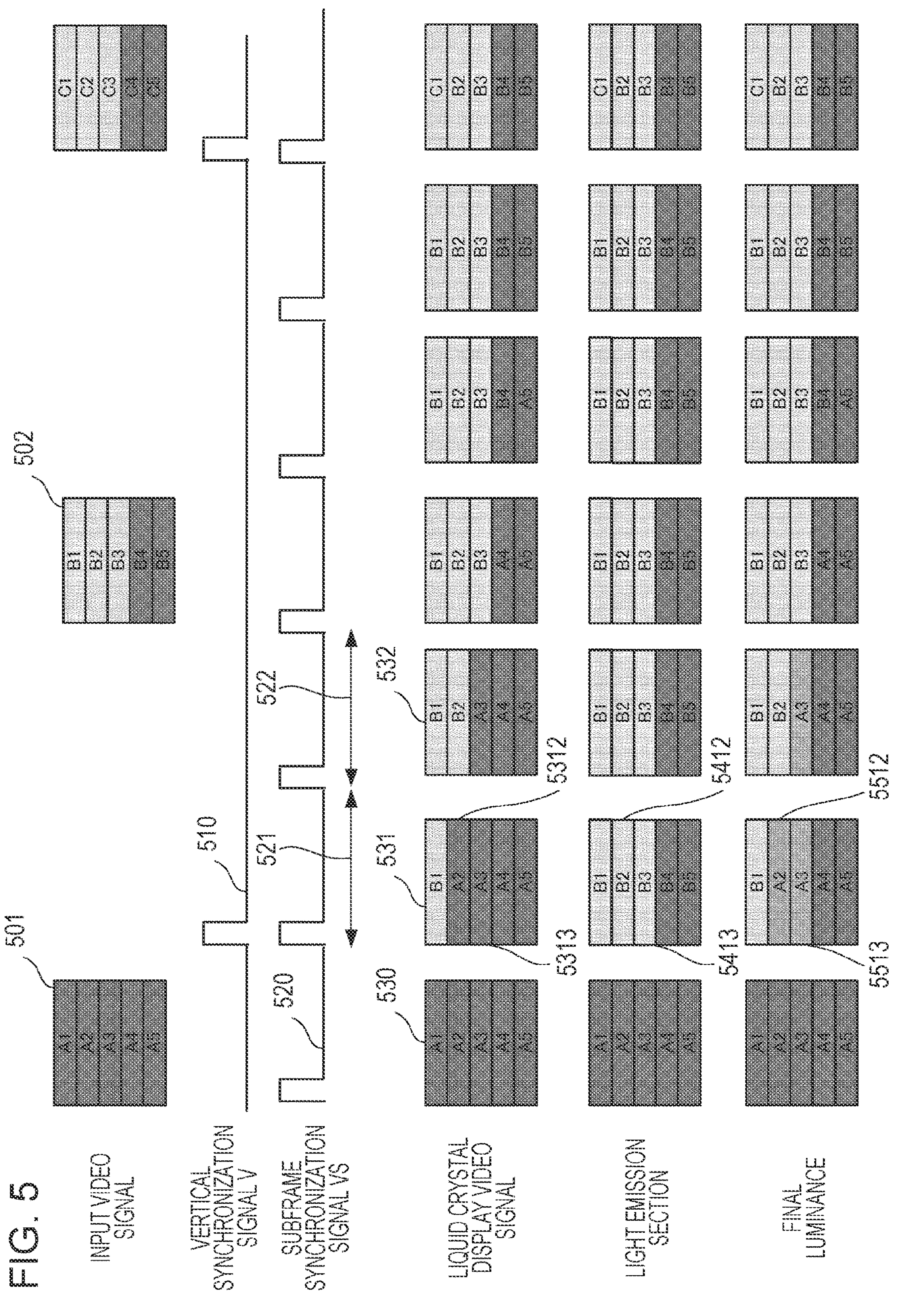
FIG. 5 is a schematic view of display luminances.

FIG. 5 is a schematic view showing how a final display luminance is when a statistic is detected and local dimming control is executed in each vertical synchronization signal period of an input video signal as in the case of the existing technique.

Initially, video signals input in respective frame periods are indicated by 501, 502, and 503. For the video signal 501, an input one-frame video is divided into five blocks in the up and down direction, the areas are defined as A1, A2 from above, and the bottom area is defined as an image A5. The video signal 501 is displayed in black all over the screen.

Similarly, the video signal 502 is divided into video areas B1 to B5, and the video signal 503 is divided into video areas C1 to C5. The video signals 502, 503 are signals of which the top three areas are changed into white signals.

A synchronization signal 510 is a vertical synchronization signal V.

A synchronization signal 520 is a subframe synchronization signal VS.

In the present embodiment, the vertical synchronization period shows a three-frame video change, and a subframe synchronization signal period shows seven subframe synchronization periods in total including five subframe synchronization periods corresponding to one-frame period and one subframe synchronization signal period of each of front and rear frames.

Video signals to be displayed on the liquid crystal panel subframe by subframe are indicated by 530, 531, and 532.

Initially, in the last subframe synchronization period in which the video signal 501 is input, the video signal 530, as in the case of the video signal 501, is displayed by liquid crystal.

In the next subframe synchronization period 521 included in the next vertical synchronization period, it is in a state 531 where the topmost area B1 of the video signal 502 is displayed by liquid crystal and, in the other areas, the last vertical synchronization period videos A2 to A5 are displayed.

A control signal of the light emission section 102 is calculated in accordance with a statistic calculated from the video signal 502, so control is such that an area where a bright signal is input turns on bright. In other words, areas 5412, 5413 respectively associated with areas 5312, 5313 where the liquid crystal display section has not been updated yet turn on.

For this reason, as for a final luminance that has transmitted through the liquid crystal panel, a subframe flicker that an originally not displayed luminance is displayed as in the case of the area 5512 or the area 5513 occurs.

Figure 6:
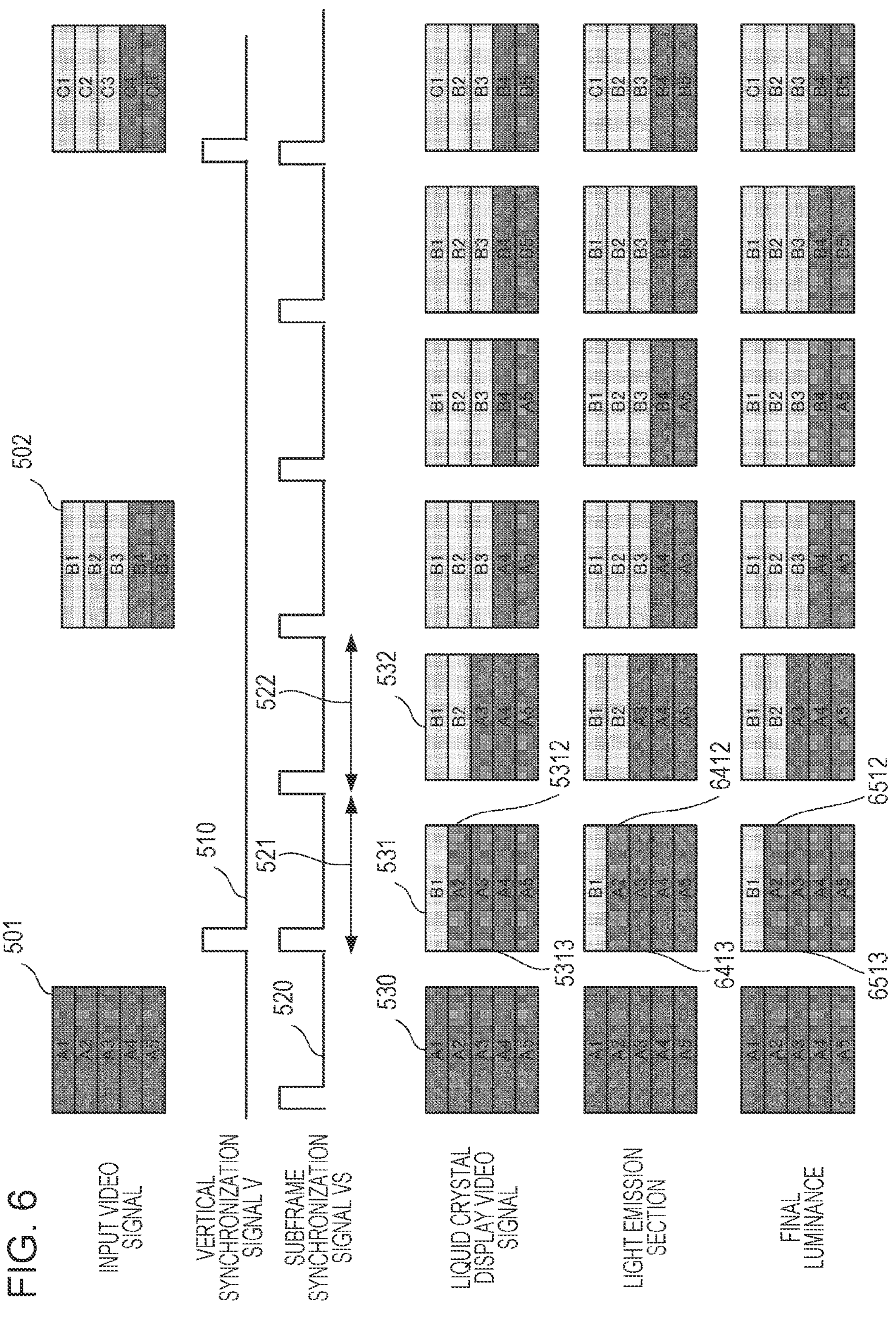
FIG. 6 is a schematic view of display luminances.

FIG. 6 is a schematic view showing how a final display luminance is when a video signal similar to that of FIG. 5 is subjected to local dimming control according to the embodiment of the disclosure.

In the embodiment of the disclosure, for each subframe synchronization period, light source control information bd is calculated in accordance with a subframe average luminance YS that correlates with the video signal 531.

For this reason, as for the luminance of the light emission section 102, areas 6412, 6413 respectively associated with areas 5312, 5313 where the liquid crystal display section has not been updated yet do not turn on.

Therefore, as for a final luminance that has transmitted through the liquid crystal panel, a luminance similar to a video signal is displayed and no subframe flicker that has occurred in the existing technique occurs as in the case of the areas 6512, 6513. In the next and following subframe synchronization periods as well, a final luminance synchronized with a video signal is similarly obtained.

Modification 1

In local dimming control of the present embodiment, the method of controlling only the light emission section 102 has been described.

However, the method of the present embodiment may be applied to local dimming control using both light sources and signal processing. Generally, in the case of local dimming control that also performs the signal processing, the luminance is corrected by signal processing by the amount of change in the brightness of the light emission section 102 to maintain luminance reproducibility.

The benefit of the embodiment of the disclosure when the local dimming control using signal processing will be described with reference to FIG. 7 and FIG. 8.

Figure 7:
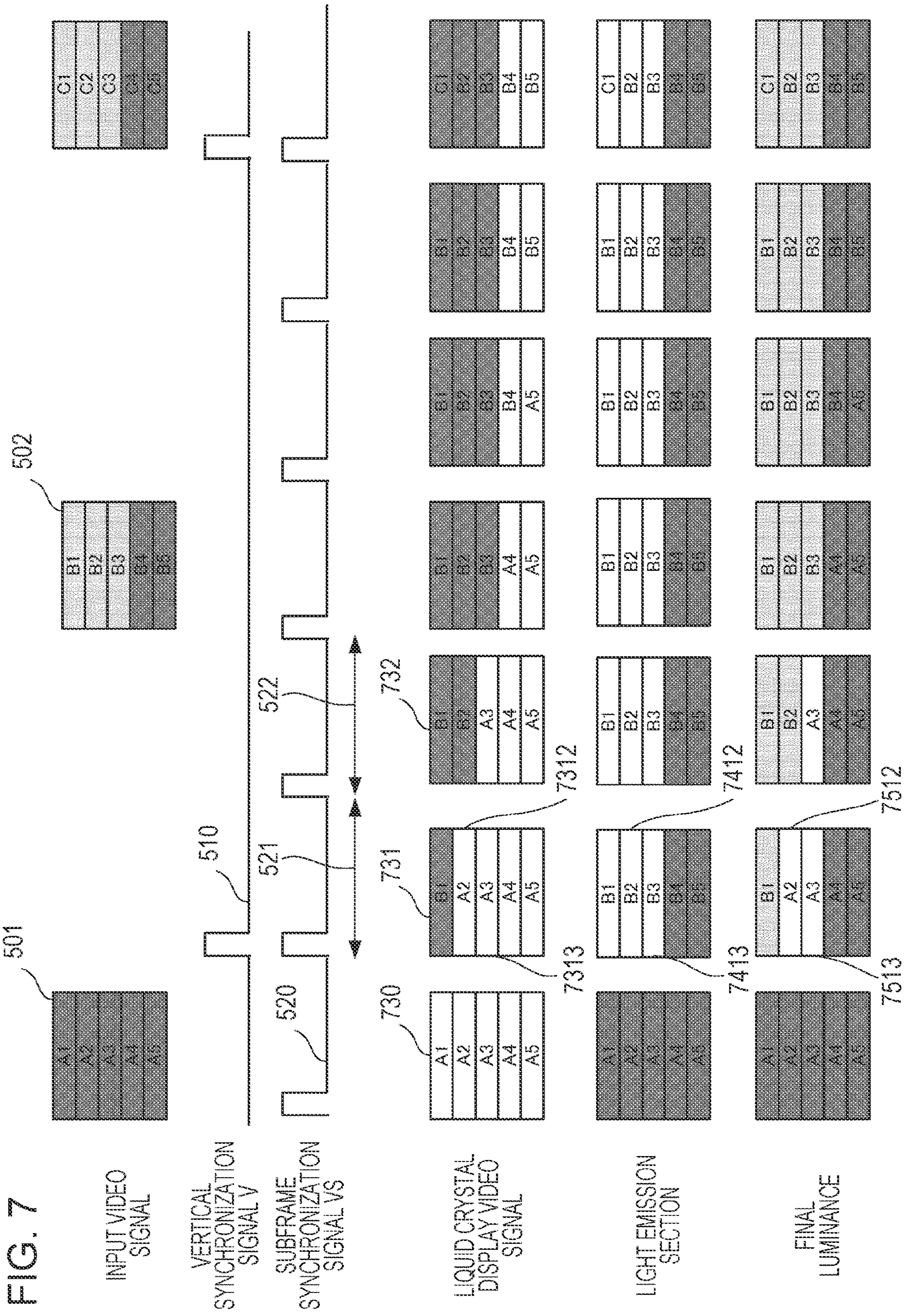
FIG. 7 is a schematic view of display luminances during signal processing local dimming control.

FIG. 7 is a schematic view showing how a final display luminance is when a statistic is detected and local dimming control using signal processing is executed in each vertical synchronization signal period of an input video signal in existing control.

Initially, video signals input in respective frame periods are similar to those of FIG. 5.

Video signals to be displayed on the liquid crystal panel subframe by subframe are respectively indicated by 730, 731, and 732.

Initially, in the last subframe synchronization period in which the video signal 501 is input, the video signal 730 is displayed by liquid crystal as a bright signal. This is because, in local dimming control using signal processing, signal processing is corrected to be bright by the amount by which the brightness of the light emission section 102 is darkened.

In the next subframe synchronization period 521 included in the next vertical synchronization period, it is in a state 731 where the topmost area B1 of the video signal 502 is displayed by liquid crystal and, in the other areas, the last vertical synchronization period videos A2 to A5 are displayed.

A control signal of the light emission section 102 is calculated in accordance with a statistic calculated from the video signal 502, so control is such that an area where a bright signal is input turns on bright.

However, areas 7412, 7413 respectively associated with areas 7312, 7313 where the liquid crystal display section has not been updated yet for each subframe period also turn on bright.

For the signal processing of local dimming, the brightness of the light emission section increases, with the result that a liquid crystal display signal of an associated light emission area is displayed dark.

Since the liquid crystal panel changes a signal over one frame period, the brightness changes in the topmost area in the subframe synchronization period 521.

For this reason, as for a final luminance that has transmitted through the liquid crystal panel, a subframe flicker that an originally not displayed luminance is displayed as in the case of the area 7512 or the area 7513 occurs.

In the subsequent subframe synchronization period 322, it is in a state 332 where a signal up to the area B2 is updated, and the remaining areas A3 to A5 are not updated.

In this way, on the liquid crystal panel, a video is updated from the top area for each subframe synchronization period, so a subframe flicker occurs unless local dimming control synchronized with a change in the liquid crystal panel is performed in each subframe synchronization period.

Figure 8:
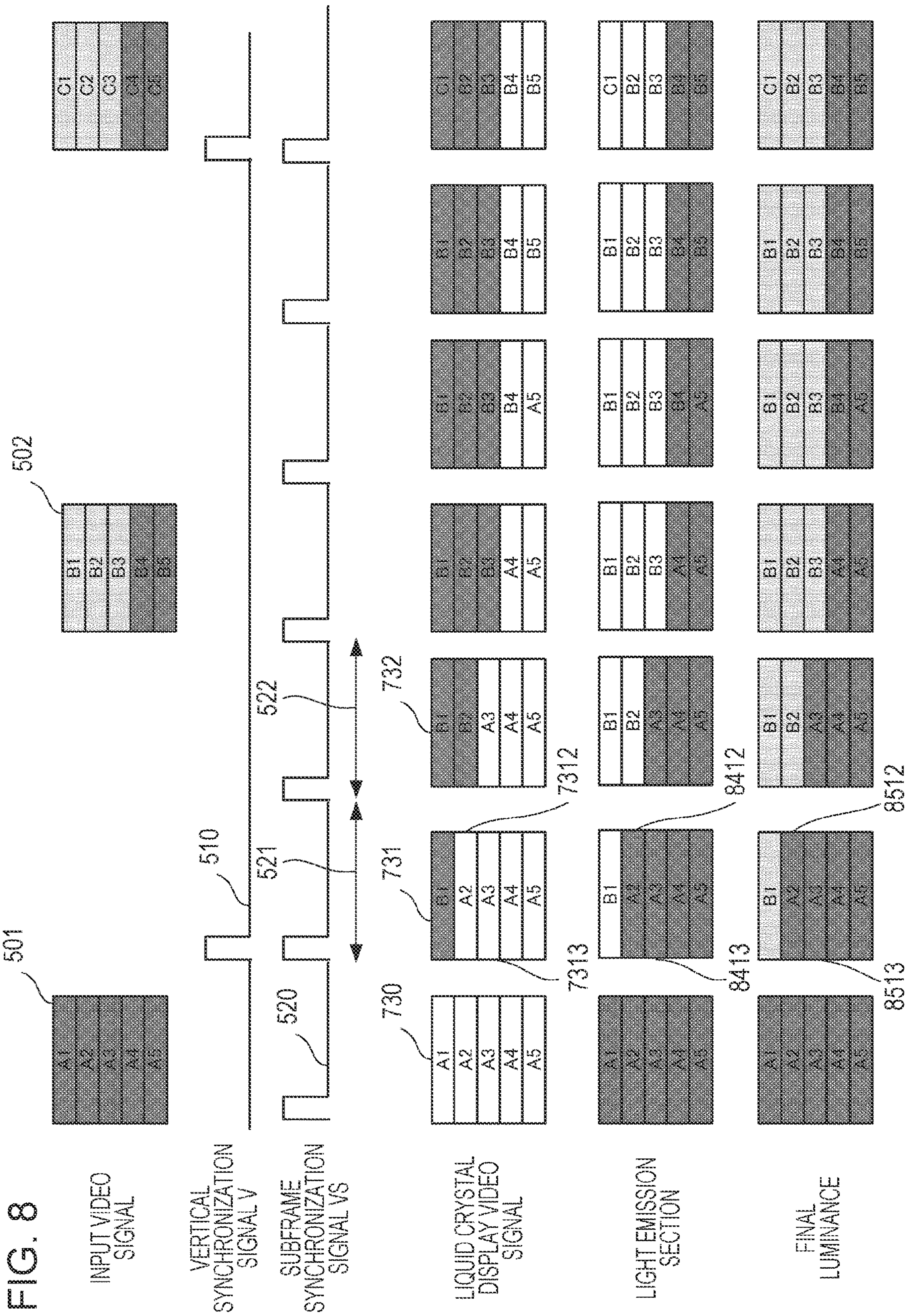
FIG. 8 is a schematic view of display luminances during signal processing local dimming control.

FIG. 8 is a schematic view showing how a final display luminance is when a video signal similar to that of FIG. 7 is subjected to local dimming control with signal processing according to the embodiment of the disclosure.

In the embodiment of the disclosure, for each subframe synchronization period, light source control information bd is calculated in accordance with a subframe average luminance YS that correlates with the liquid crystal display video signal 531.

For this reason, as for the luminance of the light emission section 102, areas 8412, 8413 respectively associated with areas 7312, 7313 where the liquid crystal display section has not been updated yet do not turn on.

Therefore, as for a final luminance that has transmitted through the liquid crystal panel, a luminance similar to a video signal is displayed and no subframe flicker that has occurred in the existing technique occurs as in the case of the area 8512 or the area 8513. In the next and following subframe synchronization periods as well, a final luminance synchronized with a video signal is similarly obtained.

In local dimming control with signal processing as well, a subframe flicker is reduced by operating the light emission section and performing signal processing in accordance with a statistic that correlates with a video signal displayed on the liquid crystal panel for each subframe synchronization period.

Modification 2

In the present embodiment, the method of controlling the memory section such that the memory section ensures a memory capacity used to adjust timing to start displaying a video signal on the display section 101 with a turn-on control signal D output from the LED drive section 107 has been described.

Generally, it is known that, as the characteristics of the liquid crystal panel, the response of liquid crystal elements is poor and the response varies. For this reason, even when no memory section 108 is provided but the same effect as the memory section 108 is obtained by the response of liquid crystal itself, the memory section 108 may be omitted. In this case as well, the benefit of the present embodiment is obtained.

Modification 3

In the present embodiment, it has been described that the effect of reducing a subframe flicker according to the embodiment of the disclosure is obtained by preparing the memory section 108 having a memory capacity less than a frame memory.

Generally, it is known that, as an existing technique, a frame memory is installed and local dimming control for controlling turn-on timing in units of frame period is executed.

In this case, local dimming control delays in units of frame period.

On the other hand, when a display apparatus is caused to display a video signal with high real time characteristics, such as a gaming video, an input video signal is to be displayed with a small delay.

In the present embodiment, the method of ensuring and controlling a memory capacity used to adjust timing to start displaying a video signal on the display section 101 with a turn-on control signal D output from the LED drive section 107 has been described.

In other words, local dimming control with the effect of reducing a subframe flicker is possible with a small delay process using a memory of about several tens of lines.

When a user intends to display a video with a small delay while local dimming control is being executed, local dimming control is to be switched from existing control to control according to the embodiment of the disclosure.

In other words, a user is able to implement small-delay local dimming control by switching a local dimming control method using an external control method, such as a menu operation, to a display apparatus.

Modification 4

In the present embodiment, the method in which the statistic detection section 104 calculates an average luminance Y, associated with five BL control areas of the light emission section 102, from a video signal input in real time has been described.

Generally, the number of divided BL control areas of the light emission section 102 is at most about several thousands, so the number of pixels in one BL control area is several hundreds of pixels. For this reason, in one BL control area, data for pixels not subjected to a process of updating video data and data of pixels subjected to an update process are present.

To address this inconvenience, a frame memory that stores last-frame video data is prepared in the statistic detection section 104.

Then, a process of detecting an average luminance Y of each BL control area while overwriting video data in the frame memory with video data input in real time as occasion arises may be executed.

With this control, an average luminance Y is calculated by grasping data of pixels not subject to a process of updating video data and data of pixels subjected to an update process in a control area.

In other words, even when the update statuses of pixel data in a control area vary, the statistic detection section 104 calculates an average luminance Y in consideration of the update statuses. Thus, the statistic detection section 104 is able to calculate light source control information bd according to the state of the display section 101. With this control, a subframe flicker reduces.

Modification 5

In the present embodiment, control for reducing a subframe flicker with LD control has been described.

This is also an effective control method in GD control for uniformly changing the brightness of light sources all over the screen.

However, in GD control, the brightness values of all the light sources all over the screen are controlled. In this case, light source control information bd is determined in accordance with an average luminance Y that correlates with a video signal displayed on the liquid crystal panel for each subframe period.

In this way, with GD control as well, control over light source luminances according to sequential scanning state of the liquid crystal panel, which changes for each subframe period, is possible.

In other words, a subframe flicker can be reduced by executing light source control in a subframe period even in GD control.

Benefit of Display Apparatus

A statistic that correlates with the liquid crystal panel that updates a video signal over one vertical synchronization period can be calculated by updating the above-described statistic that determines the amount of light of the light emission section in units of subframe. By controlling the amount of light of the light emission section in accordance with the statistic updated in units of subframe, the amount of light of light sources, synchronized with a change in the liquid crystal panel, is able to be controlled. In other words, a subframe flicker can be reduced.

Second Embodiment

In the first embodiment, a subframe flicker is reduced by controlling the amount of light emitted from the light emission section in each subframe period in accordance with a statistic of a video signal of each subframe period.

In contrast, the second embodiment differs from the first embodiment in that it detects a statistic in which the response speed of the liquid crystal panel is taken into consideration the response speed of the liquid crystal panel is taken into consideration.

Hereinafter, portions different from the first embodiment will be described, and the description of the same portions as those of the first embodiment is omitted as needed.

Figure 9:
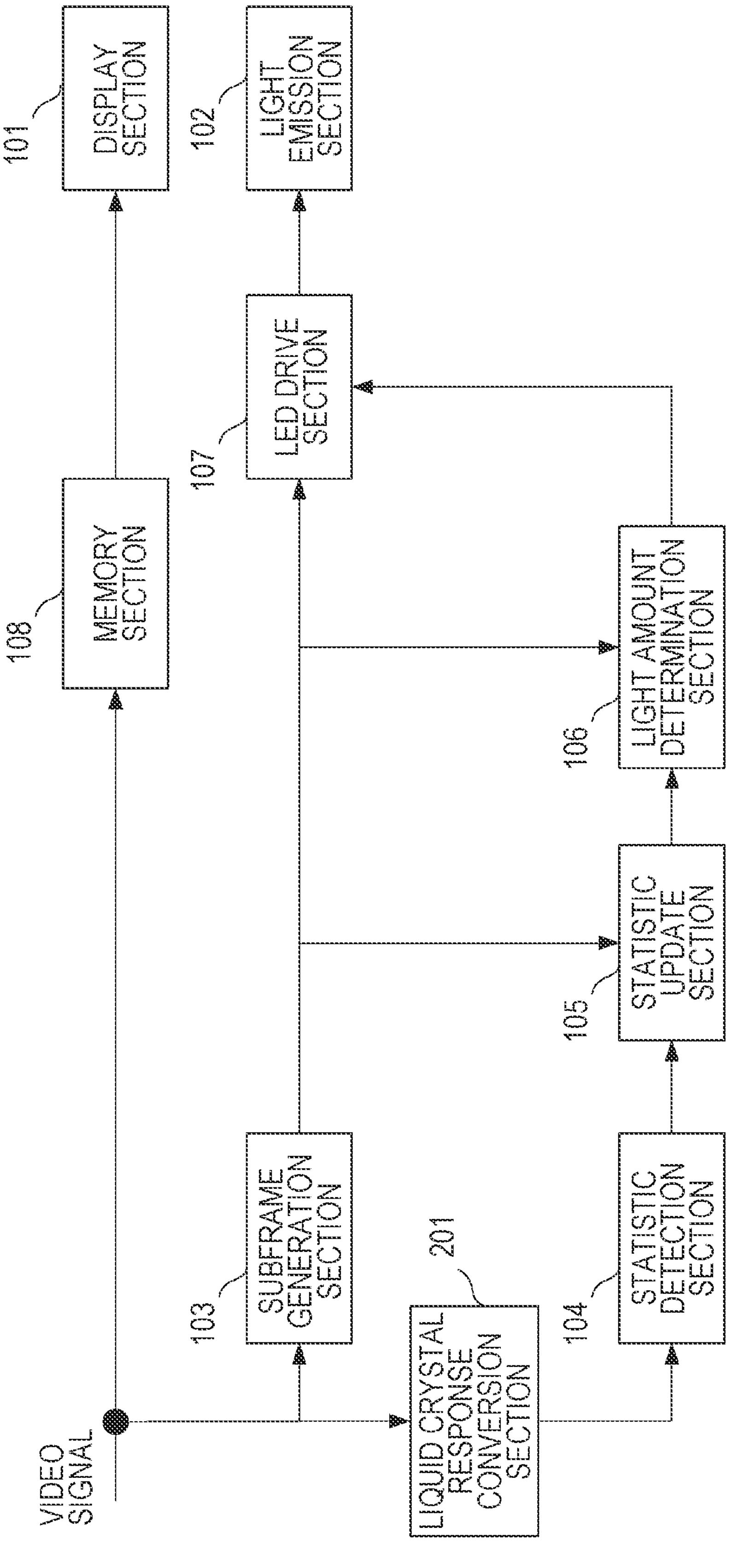
FIG. 9 is a block diagram showing the configuration of a display apparatus according to a second embodiment.

FIG. 9 is a block diagram showing an example of the configuration of a display apparatus according to the second embodiment. A difference from the first embodiment is that a liquid crystal response conversion section 201 that converts a video signal to a video signal that takes the response of liquid crystal into consideration is added.

The liquid crystal response conversion section 201 is a conversion section that converts an input video signal to a video signal displayed on the display section 101, which takes the response of a change in transmittance into consideration. The liquid crystal response conversion section 201 calculates a liquid crystal response video signal LC, which takes a temporal amount of change in transmittance into consideration, in accordance with an input video signal and a response information table AL for each frame period.

The response information table is table data that stores the response of a change in transmittance according to a change in video signal of the display section 101

FIG. 10 shows a schematic view of a response table data structure. In FIG. 10, the ordinate axis represents a signal tone of a current frame, and the abscissa axis represents a signal tone of a last frame. The table data of FIG. 10 is a value indicating up to which level an input signal changes in a current frame from the relationship between a signal tone of a current frame and a signal of a last frame.

By using the response table data, the liquid crystal response video signal LC is calculated by using the expression (2).

$$LC[i]=AL[i][j]\times i \quad (2)$$

AL[i][j] is a value of the response information table AL in the case where data of the last frame is j tone and data of the current frame is i tone.

The liquid crystal response video signal LC is output to the statistic detection section 104 as a video signal.

In this way, when an input video signal is converted to a video signal that takes the response of liquid crystal into consideration, an average luminance Y to be output from the statistic detection section 104 is also a value that takes the response of liquid crystal into consideration.

The brightness of the light emission section 102 depends on light source control that takes the response of the liquid crystal panel into consideration.

When light emitted from the light emission section 102 transmits through liquid crystal, a control error of a finally displayed luminance reduces, and unintended luminance display decreases, with the result that a subframe flicker can be reduced.

In other words, by taking the response of liquid crystal into consideration, further accurate light source luminance control is able to be performed, so a subframe flicker can be reduced as in the case of the first embodiment.

Benefit of Display Apparatus

As described above, the liquid crystal response conversion section 201 converts a video signal into a video signal that takes the response of liquid crystal into consideration in accordance with a change in video data frame by frame. The light source control information bd that is the brightness of the light sources is controlled in accordance with the video signal that takes the response of liquid crystal into consideration. A luminance control error is reduced by controlling a light source luminance that takes the response of the liquid crystal into consideration subframe by subframe, so a subframe flicker can be reduced.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-177597 filed Oct. 22, 2020, which is hereby incorporated by reference herein in its entirety.

What is claimed is:

1. An apparatus that displays a video in accordance with an input signal, the apparatus comprising:

- a backlight including a plurality of light sources;
- a panel configured to display the video by modulating light from the backlight;
- at least one processor; and
- at least one memory coupled to the at least one processor, the at least one memory having instructions that, when executed by the at least one processor, perform operations as:
- a determination section configured to determine an amount of light of each of the plurality of light sources subframe by subframe, a subframe period being shorter than one frame period;
- a controller configured to control the plurality of light sources in accordance with the determined amounts of light subframe by subframe;
- an acquisition section configured to acquire statistics in a plurality of areas subframe by subframe in accordance with the input signal, the statistics being an average luminance value for each of a plurality of areas for a signal of the video and a maximum luminance value for each of the plurality of areas; and
- a statistic update section configured to update a number of the average luminance value each corresponding to the plurality of areas for the signal of the video,
- wherein the amount of light of each of the plurality of light sources is determined subframe by subframe in accordance with the statistics.

2. The apparatus according to claim 1, wherein the acquisition section is configured to calculate the statistics subframe by subframe while writing the input signal into a frame memory.

3. The apparatus according to claim 1, further comprising a memory configured to temporarily store the input signal, wherein

- timing to display the video on the panel and timing to emit light with the backlight are adjusted so as to coincide with each other.

4. The apparatus according to claim 3, wherein a capacity of the memory is greater than or equal to a capacity used to calculate the statistics subframe by subframe.

5. The apparatus according to claim 1, wherein the at least one processor further performs operation as a conversion section configured to convert the input signal to a signal incorporating a response of the panel, wherein

- the acquisition section is configured to acquire the statistics in accordance with a signal that incorporates the response.

6. The apparatus according to claim 1, wherein the controller is configured to execute local dimming control in accordance with the determined amounts of light.

7. The apparatus according to claim 1, wherein the determination section is configured to determine the amount of light of each of the plurality of light sources subframe by subframe or frame by frame, and the controller is configured to execute first local dimming control in accordance with the determined amount of light subframe by subframe or second local dimming control in accordance with the determined amount of light frame by frame.

8. The apparatus according to claim 1, wherein the maximum luminance value is a maximum luminance value when local dimming control is set in an off state.

9. A method for an apparatus that includes a backlight including a plurality of a backlight including a plurality of light sources and a panel configured to display a video by modulating light from the backlight, the apparatus being configured to display the video in accordance with an input signal, the method comprising:

determining an amount of light of each of the plurality of light sources subframe by subframe, a subframe period being shorter than one frame period;

controlling the plurality of light sources in accordance with the determined amounts of light subframe by subframe;

acquiring statistics in a plurality of areas subframe by subframe in accordance with the input signal, the statistics being an average luminance value for each of a plurality of areas for a signal of the video and a maximum luminance value for each of the plurality of areas; and updating a number of the average luminance values each corresponding to the plurality of areas for the signal of the video, wherein the amount of light of each of the plurality of light sources is determined subframe by subframe in accordance with the statistics.

10. The method according to claim 9, wherein the acquiring includes calculating the statistics subframe by subframe while writing the input signal into a frame memory.

11. The method according to claim 9, further comprising temporarily storing the input signal, wherein timing to display the video on the panel and timing to emit light with the backlight are adjusted so as to coincide with each other.

12. The method according to claim 9, further comprising converting the input signal to a signal incorporating a response of the panel, wherein the acquiring acquires the statistics in accordance with a signal that incorporates the response.

13. The method according to claim 9, wherein the controlling executes local dimming control in accordance with the determined amounts of light.

14. The method according to claim 9, wherein the determining determines the amount of light of each of the plurality of light sources subframe by subframe or frame by frame, and the controlling executes first local dimming control in accordance with the determined amount of light subframe by subframe or second local dimming control in accordance with the determined amount of light frame by frame.

15. A non-transitory computer readable storage medium storing a program for causing a computer to execute a method for an apparatus that includes a backlight including a plurality of light sources and a panel configured to display a video by modulating light from the backlight, the apparatus being configured to display the video in accordance with an input signal, the method comprising:

determining an amount of light of each of the plurality of light sources subframe by subframe, a subframe period being shorter than one frame period;

controlling the plurality of light sources in accordance with the determined amounts of light subframe by subframe;

acquiring statistics in a plurality of areas subframe by subframe in accordance with the input signal, the statistics being an average luminance value for each image range of a signal of the video and a maximum luminance value for each of the plurality of areas; and updating a number of the average luminance values each corresponding to the plurality of areas for the signal of the video, wherein the amount of light of each of the plurality of light sources is determined subframe by subframe in accordance with the statistics.

16. The non-transitory computer readable storage medium according to claim 15, wherein the acquiring includes calculating the statistics subframe by subframe while writing the input signal into a frame memory.

17. The non-transitory computer readable storage medium according to claim 15, further comprising temporarily storing the input signal, wherein timing to display the video on the panel and timing to emit light with the backlight are adjusted so as to coincide with each other.

18. The non-transitory computer readable storage medium according to claim 15, further comprising converting the input signal to a signal incorporating a response of the panel, wherein the acquiring acquires the statistics in accordance with a signal that incorporates the response.

19. The non-transitory computer readable storage medium according to claim 15, wherein the controlling executes local dimming control in accordance with the determined amounts of light.

20. The non-transitory computer readable storage medium according to claim 15, wherein the determining determines the amount of light of each of the plurality of light sources subframe by subframe or frame by frame, and the controlling executes first local dimming control in accordance with the determined amount of light subframe by subframe or second local dimming control in accordance with the determined amount of light frame by frame.

* * * * *